United States Patent
Van Berkum et al.

(10) Patent No.: US 10,767,025 B2
(45) Date of Patent: Sep. 8, 2020

(54) PA/PET SEPARATION PROCESS

(71) Applicant: Ioniqa Technologies B.V., Eindhoven (NL)

(72) Inventors: Susanne Van Berkum, Eindhoven (NL); Sonja Irene-Marie Reginalde Castillo, Eindhoven (NL)

(73) Assignee: Ioniqa Techonolgies B.V. (NL)

( * ) Notice: Subject to any disclaimer, the term of this patent is extended or adjusted under 35 U.S.C. 154(b) by 246 days.

(21) Appl. No.: 15/774,557

(22) PCT Filed: Nov. 9, 2016

(86) PCT No.: PCT/EP2016/001860
§ 371 (c)(1),
(2) Date: May 8, 2018

(87) PCT Pub. No.: WO2017/080651
PCT Pub. Date: May 18, 2017

(65) Prior Publication Data
US 2020/0140647 A1    May 7, 2020

(30) Foreign Application Priority Data
Nov. 9, 2015 (NL) .................................. 2015749

(51) Int. Cl.
*C08J 11/08* (2006.01)
*B29B 17/02* (2006.01)
*B29K 67/00* (2006.01)
*B29K 77/00* (2006.01)

(52) U.S. Cl.
CPC ............ *C08J 11/08* (2013.01); *B29B 17/02* (2013.01); *B29B 2017/0203* (2013.01); *B29B 2017/0224* (2013.01); *B29K 2067/003* (2013.01); *B29K 2077/00* (2013.01); *C08J 2367/02* (2013.01); *C08J 2377/00* (2013.01)

(58) Field of Classification Search
USPC ........ 156/152, 180, 276; 210/488, 489, 491, 210/493, 505; 521/48.5
See application file for complete search history.

(56) References Cited

U.S. PATENT DOCUMENTS

| | | |
|---|---|---|
| 2,742,440 A | 4/1956 | Stott et al. |
| 3,696,058 A | 10/1972 | Teti |
| 5,889,142 A | 3/1999 | Mohajer et al. |

FOREIGN PATENT DOCUMENTS

| | | |
|---|---|---|
| CH | 708675 | 4/2015 |
| JP | 2002060536 | 2/2002 |
| JP | 2009120766 | 6/2009 |
| WO | WO 98/35998 | 8/1998 |
| WO | WO 00/29463 | 5/2000 |
| WO | WO 02/36668 | 5/2002 |

OTHER PUBLICATIONS

International Search Report and Written Opinion for international Application No. PCT/EP2016/001860, Filed Nov. 9, 2016, dated Feb. 16, 2017.

*Primary Examiner* — Terressa Boykin
(74) *Attorney, Agent, or Firm* — Husch Blackwell LLP

(57) ABSTRACT

The present invention is in the field of an improved separation process for mixed polymers, typically provided in a waste stream, comprising a polyamide (PA) and a polyethylene terephthalate (PET). The process comprises providing a composition having a density of 50-500 gr/dm3, adding an alcohol to the composition heating the mixture to a temperature above 150° C., cooling by adding hot water, filtering with a first filter, filtering with a second filter to recover the polyamide, and recovering the polyester for further processing for depolymerization.

15 Claims, 1 Drawing Sheet

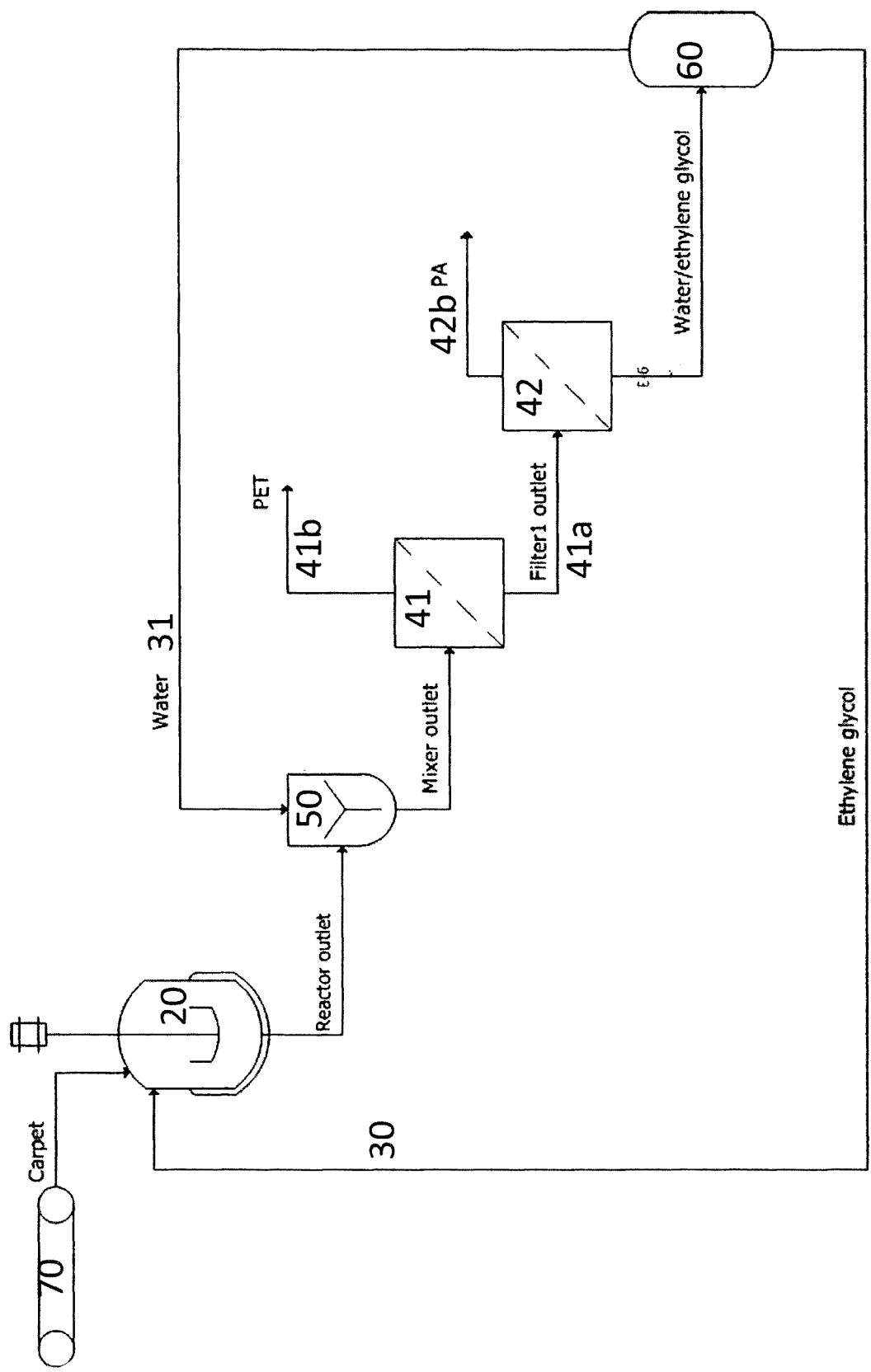

PA/PET SEPARATION PROCESS

CROSS REFERENCE TO RELATED APPLICATIONS

This is a U.S. National Stage of International Patent Application No. PCT/EP2016/001860 filed Nov. 9, 2016, which claims the benefit of and priority to Netherlands Application No. 2015749, filed Nov. 9, 2015 (now NL 2015749) all of which are incorporated by reference herein in their entireties.

FIELD OF THE INVENTION

The present invention is in the field of an improved separation process for mixed polymers, typically provided in a waste stream, comprising a polyamide and a polyethylene terephthalate.

BACKGROUND OF THE INVENTION

Polyamides are a group of macromolecules with repeating units linked by amide bonds (such as O=C—NH—C). Artificial polyamides relate to materials such as nylons, aramids, and sodium poly(aspartate). Polyamides may relate to aliphatic polyamides, such as PA6 and PA 66, polyphtalamides, such as PA 6T, and aramides. Synthetic polyamides are commonly used in textiles, automotive applications, carpets and sportswear due to their high durability and strength. The transportation industry is the major consumer, accounting for 35% of polyamide (hereinafter also referred to as PA) consumption;

In various applications, such as in carpets, the polyamides are mixed with further materials and additives. One of the main materials being present is a polyester material-called polyethylene terephthalate (PET). In addition further additives may be present, typically fillers and the like.

For re-using the raw materials the various components need to be separated effectively. The amount of materials that are currently re-used in the Netherlands only is already 400 ktons per year, which is already a huge amount. A proper separation process is therefore needed.

Some prior art processes are known. U.S. Pat. No. 5,430,068 A recites a process for recovering aliphatic polyamide from admixtures thereof with foreign materials comprising the steps of: (1) dissolving the polyamide at an elevated temperature in a solvent selected from the group consisting of a substantially anhydrous ethylene glycol, propylene glycol, and aliphatic carboxylic acid having from 2 to 6 carbon atoms; (2) separating any insoluble foreign material from the polyamide solution; (3) combining the polyamide solution with an additional quantity of substantially the same solvent at a temperature sufficiently below the temperature of the solution to quench the solution and cause the polyamide to precipitate; and (4) recovering the polyamide precipitate. This procedure is considered somewhat cumbersome in view of process steps. In addition water, typically being present especially in a washed waste material, is excluded from the process. In addition it is preferred to use acidic conditions. For neutralizing an amount of base is then required, and as a result typically a salt is obtained. As such the process is relatively costly.

WO00/29463 discloses a further process for the separation of different polyamides, especially PA6 and PA6,6 (also known as nylon 6 and Nylon 6,6). Use is made of ethylene glycol or particularly glycerol as a solvent. The nylons will dissolve in highly pure glycerol upon heating to 205° C. Upon cooling, first the PA6,6 and subsequently the PA6 will precipitate. When the PA6,6 has been precipitated, but the PA6 is still in solution, the mixture can be filtrated, resulting in a separation. Finally, the PA6 may be recovered by precipitation and washing with water, for instance at 40° C. According to said patent application, the process of heating and selective precipitation is preferably repeated several times to increase purity.

Again, the solvent is highly pure glycerol and water is excluded. One of the reasons is that a mixture of water and glycerol is slightly basic and may further corrode metal of the vessel to get slightly acid. Both in slightly acid and in slightly basic conditions at a high temperature, hydrolysis may occur. This is undesired for the polyamide, as it makes it more difficult to recover the water soluble amide oligomer.

Alternative processes for separation of polyamides therefore use a mixture of water and lower alkyl alcohols with a single alcohol group, such as methanol, ethanol, isobutanol, as described in U.S. Pat. No. 2,742,440 and WO02/36668, for instance. However, the precipitation of nylon would start around 160° C., with the risk that the nylon precipitates onto the polyester fibres, such as PET fibres. This would significantly hinder separation of the polyester from the polyamide. Moreover, in order to keep the water sufficiently liquid above its boiling point, higher pressures are needed. This however is disadvantageous in that the waste material often has a very low density. Such very low density material is preferably added in portions into the reactor, and a volume reduction may occur. To combine this with significantly higher pressures is deemed less practical.

Therefore there still is a need for an improved separation process which is more cost effective, simple, and is more robust/without generating further waste streams such as salts.

The present invention provides an improved method of removing additives and an additive capturer e.g. for degrading polymers which overcomes at least one of the above disadvantages, without jeopardizing functionality and advantages.

SUMMARY OF THE INVENTION

The present invention relates in a first aspect to an improved separation process for mixed polymers, typically provided in a waste stream, comprising a polyamide and a polyester, such as polyethylene terephthalate, according to claim 1. Therewith the cradle to cradle principle is supported.

The present composition comprises as a main component PA, typically 30-95 wt. %, such as 50-90 wt. %, and further 5-25 wt. % polyester, such as PET, such as 10-20 wt. % PET. The weight percentages given throughout the description and in the claims are relative to a total weight of the present composition.

In order to process the composition a density thereof is typically reduced, such as by fluffing. The composition comprises than relatively small bits of loose material and lots of air in between said material. It has been found that for the present process suitable densities are in the range of 50-500 gr/dm$^3$, preferably 100-250 gr/dm$^3$, more preferably 150-200 gr/dm$^3$.

To this composition an alcohol is added. The alcohol need not be very pure and may contain a small amount of water. Typically 0.02-25 wt. % water is present in the alcohol, preferably 0.1-20 wt. %, more preferably 0.2-15 wt. %, such as 0.5-10 wt. %. The alcohol has a boiling point above 100° C. (at 100 kPa) in view of reaction conditions. The boiling point may be increased relative to a pure alcohol due to the impurities (e.g. water) present. Alternatively or additionally, the composition may contain water, which forms an alcohol-water mixture upon addition of the alcohol.

A next step relates to heating the mixture to a temperature above 150° C. under reflux until the PA is dissolved. The temperature is preferably above 160° C., more preferably above 170° C., such as above 190° C., in view of recovery of PA from the composition-. The heating is typically performed for a period of 10-60 minutes, such as 20-30 minutes. The pressure is typically from 90-200 kPa, such as atmospheric. The heating step results in the formation of a slurry. While the polyamide is at least partially dissolved, the polyester and the additives do not dissolve, therewith forming a slurry. It is preferred that the heating is carried out such that all polyamide is dissolved. However, this is not deemed necessary. Minor amounts, for instance up to 10%, such as up to 5%, preferably up to 3% or even up to 1% by weight relative to the initial amount of polyamide may remain undissolved.

After the dissolution step, the slurry is cooled, and hot water is added. The hot water may be boiling water. It is not excluded that the hot water is added as an aqueous solution, or as a mixture of alcohol and water.

In one embodiment, the cooling step is preferably carried out such that the slurry is only contacted with water after cooling to a temperature such that the temperature of the added water and the slurry do not differ very much, for instance at most 50° C. This is deemed beneficial so as to prevent that the temperature in the slurry would decrease inhomogeneously with the risk of uncontrolled precipitation.

In another embodiment, the cooling step involves contacting the slurry with water and/or steam. In one further implementation, the hot water may be added as a mixture of the alcohol and water. This embodiment has the advantage of accelerating the cooling step. Moreover, there is no need to use a 'cold wall' for cooling, which might give rise to precipitation of the polyamide on the cooling wall.

In a further embodiment, the cooling step further involves reducing the pressure. This step is suitably carried out upon bringing the slurry in a filtration chamber including the first filter, wherein an underpressure is applied over the filter.

Subsequently, a step of filtering is performed over a first filter with a mesh larger than 0.2 µm therewith forming a filtrate. Herewith the polyester, such as the PET is separated from the PA; the PET remains on the filter, whereas the PA goes through the filter as a liquid and in the form of small particles. The mesh is preferably not too small in order to allow passage of the liquid, and clearly not too large in order to retain the PET, e.g. smaller than 10 µm. In one embodiment, the mesh is between 5 and 9 µm. In addition to the mesh size also a pressure used may play a role; a larger under pressure typically allows for smaller mesh sizes. In a further embodiment, the mesh is for instance in the range of 0.5-2 µm. Such mesh is deemed beneficial to ensure that the additive, such as a chalk type of material, becomes part of the residue.

After collecting the filtrate the PA is precipitated and can be further processed or re-used.

Therewith the present process provides an efficient way of separating PA from PET and generating a re-usable PA-fraction. The process is relatively robust, insensitive to additives and impurities, and can make use of relatively low grade alcohol comprising water. In addition the number of process-steps is limited. As such the present process is especially suited for waste material streams, such as from carpets, which comprise PA and PET. Moreover, also the PET or other polyester is ready for further processing and particularly depolymerization.

Thereby the present invention provides a solution to at least one of the above mentioned problems. The various examples and embodiments of the present invention may be combined.

Advantages of the present description are detailed throughout the description.

DETAILED DESCRIPTION OF THE INVENTION

The present invention relates in a first aspect to a process according to claim 1. Herein, water is added only after dissolution of the polyamide and cooling of the resulting slurry. The water is particularly added as hot water so as to dilute the solution, rather than to achieve a cooling effect. By adding hot water, suitably water with a temperature of at least 80° C., preferably at least 90° C. or even boiling water, the polyamide will precipitate out into relatively small particles, without causing full precipitation or a significant increase in viscosity. By using a first filter with a mesh size larger than that of the diameter of the small polyamide particles, these polyamide particles will flow through the first filter. The addition of the water before passing the slurry through the first filter has the major benefit that the polyamide will not substantially precipitate onto the polyester fibers in the residue. The addition of the water results furthermore in a decrease in viscosity.

In an example the present process comprises the step of adding 0.1-150 wt. % water to the slurry, such as 5-50%, or 10-30%. In one embodiment, as little as 0.2-15 wt. % water is added, more preferably 1-10 wt. %, such as preferably 2-8 wt. %. However, in alternative embodiments, the amount of water is larger, for instance around 25 wt % or even much more, for instance 75-125% (approximately the same amount as the alcohol). It is deemed suitable that the amount of water is reduced, in view thereof that the alcohol-water mixture is typically processed, particularly by distillation, to regain the alcohol in sufficiently pure form, for instance with a water content of at most 1 wt %. Furthermore, the amount of water needed will depend on the amount of polyamide in view of the desired PA precipitation in the water phase.

In an example the present process comprises the further step of filtering the precipitated polyamide (PA). Therewith the PA can be recovered and is ready for further use.

In an example the present process comprises the further step of adding water to the precipitated PA to remove the alcohol. The alcohol can be re-used and the PA is purified from the alcohol impurity.

In an example of the present process the alcohol is selected from mono-alcohols, di-alcohols, and tri-alcohols. Preferably, use is made of non-halogenated alcohols. More preferably, use is made of a polyol. It is preferred to use smaller chain alcohols, such as $C_6$-$C_{10}$ mono-alcohols, and likewise preferably $C_2$-$C_{10}$ di-alcohols, more preferably $C_2$-$C_8$ di-alcohols. Examples thereof are vicinal diols, and germinal diols. Examples of suitable alcohols are) with in brackets the boiling point thereof) 1-hexanol (157.6° C.), 3-methyl-1-pentanol (152.4° C.), 4-methyl-1-pentanol (151.7° C.), 1-heptanol (176.3° C.), 2-heptanol (158.9° C.), 3-heptanol (156.8° C.), 4-heptanol (155.0° C.), 1-octanol (195.2° C.), 2-octanol (179.8° C.), 2-ethyl-1-hexanol (184.6° C.), 4-methyl-3-heptanol (169.9° C.), 5-methyl-3-heptanol (171.9° C.), 2,2,3-trimethyl-3-pentanol (152.2° C.), 1-nonanol (213.1° C.), 2-nonanol (198.5*0, 3-nonanol (194.7° C.), 4-nonanol (193.0° C.), 5-nonanol (195.1° C.), 7-methyl-1-octanol (206.0° C.), 2,6-dimethyl-4-heptanol (178.0° C.), 3,5-dimethyl-4-heptanol (187.0° C.), 3,5,5-trimethyl-1-hexanol (193.0° C.), 1-decanol (231.2° C.), and 1,4-benzenedimethanol, ethylene glycol(1,2-ethanediol ° C.) (197.5° C.), 1,3-propanediol, 1,4-butanediol, 1,5-pentanediol (240° C.), 1,2-pentanediol (2.0.6° C.), hexane-1,2-diol (224° C.), hexane-1,6-diol (250° C.), heptane-1,2-diol, heptane-1,7-diol (259° C.), octane-1,2-diol (131° C.), octane-1,8-diol (172° C.), nonane-1,3-diol, nonane-1,9-diol, decane-1,2-diol (255° C.), decane-1,10-diol, undecane-1,2-diol, undecane-1,11-diol, dodecane-1,2-diol, and dodecane-1,12-diol (324° C.).

In an example the additive of the present composition is a Ca-containing mineral, such as CaO, Ca(OH)$_2$, CaCO$_3$, a talc comprising mineral, mica, and combinations thereof. It is found that often the Ca-containing-mineral, such as CaCO$_3$, will adhere to the first filter, causing it to blind over and reduce filter efficiency. For sticky grades of CaCO$_3$ using filter bags instead of pleated filter cartridges may help reduce the tendency of the CaCO$_3$ to stick to the filters. In extreme cases a use of PTFE filter media is found suitable.

In an example the Ca-containing mineral is present in an amount of 1-15 wt. %, relative to a total weight of the composition.

In an alternative further embodiment, use is made of equipment with at least two first filters in parallel, each with an entry that can be selectively opened and closed. Such entry is suitably an entry to a chamber in which the first filter is present. More suitably, the first filters have exits that can be selectively opened and closed. One of the first filters may then be switched off, so as to remove the residue. This is most preferably done by closing the exit and adding a carrier liquid, such as an alcohol, more preferably polyol, such as ethylene glycol. The residue can then be dispersed with the carrier liquid and be removed.

In a further implementation, the thus formed dispersion is further processed for deolymerization of the polyester, more particularly PET or polyethylenefuranoate (PEF). This is suitably carried out by adding a depolymerisation depolymerization catalyst. One suitable depolymerization catalyst is for instance disclosed in WO2016/105200A1. Furthermore, use can be made of superparamagnetic γ-Fe$_2$O$_3$-nanoparticles such as known from Bartolome et al, *Green Chemistry*, 16(2014), 279. After the depolymerization, the catalyst and the additive may then be separated from the carrier liquid containing monomers and/or oligomers of the polyester. For instance, use can be made of the first filter, but alternatively, use can be made of a centrifuge treatment, or a separation by means of sedimentation. It may be useful to use a low-cost catalyst that is intended for one-time use, such as micron-sized iron-oxide particles, and that will be discarded together with the additive. If needed, a second catalyst may be added after removal of the said depolymerization catalyst, so as to drive the depolymerization further into monomers.

In an example of the present process the mass ratio of PA-comprising composition and alcohol is within a range of [1:2]-[1:100], preferably [1:3]-[1:50], more preferably [1:4]-[1:30], such as [1:5]-[1:20]. This relates to a relative excessive amount of alcohol.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

SUMMARY OF FIGURES

FIG. 1 shows a schematical layout of a reactor-assembly.

DETAILED DESCRIPTION OF FIGURES

FIG. 1 shows a schematical layout of a reactor-assembly. Carpet 70 is introduced into a stirred reactor 20. To the reactor ethylene glycol 30 is provided. The reactor is heated. The outlet of the reactor is in fluid connection with a mixer 50. Optionally water 31 is added to said mixer. The mixer outlet is fed to a first filter 41. Therein PET 41a is separated from a PA-fraction 41b. The PA fraction is lead to a second filter 42 wherein the PA 42b is separated. Ethylene glycol and water are lead to a distillation column 60. From there water is fed to mixer 50 and ethylene glycol is fed to reactor 20. The assembly can be operated in batch mode and in (semi-)continuous mode.

Examples

Initial Waste Material

Carpet producers have has large streams of polyamide (PA6 and PA6,6) that contains about 20% PET. This PET is present in the carpet as the backing into which the PA is woven to produce the carpet. When recycled, the carpet goes through a mechanical recycler which makes a fluff out of the carpet: this means that the carpet is shredded and that removal of PET is very difficult as it is completely mixed with PA. The objective of the present invention is to obtain PA in a relatively pure form. The resulting PA material may then be sent to a depolymerization facility where the PA is decomposed to caprolactam, the monomer for PA.

Separation of PET and Polyamide

The experiment was performed with the following mass ratio 1 carpet fibers:25 ethylene glycol, where PA may be PA6 or PA6,6. The carpet fibers comprised ~80% polyamide (PA) fibers and ~20% PET fibers. The polyamide fibers comprised PA6 and/or PA6,6 in different examples.

The mixture was refluxed to the boiling point of ethylene glycol, 197° C. at atmospheric pressure, for 30 minutes to disintegrate the carpet fibers and to dissolve the PA. After 30 minutes, the mixture was cooled down 100-120° C. As a result of cooling, the PA would precipitate, whereas the PET fibers remained unaffected by heating and cooling.

In order to enhance PA precipitation, boiling water was added in a 25% mass ratio compared to the initial mass ratio and mixed well.

The reaction mixture was filtered in a two-step filtration: first, over a crude filter to remove the PET fibers from the mixture. The resulting filtrate, PA precipitate in a water and EG solution, was filtered over a Buchner filter equipped with a paper filter. The majority of the PA precipitate was recovered from the paper filter, while fine PA precipitate had passed the paper filter yielding a turbid filtrate.

Test Result

PA was successfully separated from PET fibers by forming a low viscous slurry of PA and EG such that PET fibers could be removed by a crude filtration step. As such relatively pure PA and likewise relatively pure PET were obtained by the present process. Thus, mixing of PA6,6 with EG and short heating such that a slurry is formed with subsequent filtration is sufficient to separate PET fibers from PA6,6. When using a finer filter, for instance a mesh of 1-3 microns, also the additive particles, typically, chalk, could be removed.

The invention although described in detailed explanatory context may be best understood in conjunction with the accompanying examples and figures.

It should be appreciated that for commercial application it may be preferable to use at least one variations of the present system, which would similar be to the ones disclosed in the present application and are within the spirit of the invention.

The invention claimed is:

1. Process for separating a composition comprising polyamide, polyester and at least one further additive, comprising the steps of:
   providing the composition, the composition having a density of 50-500 gr/dm$^3$,
   adding a branched or un-branched alcohol to the composition therewith forming a mixture, the alcohol having a boiling point above 150° C. (at 100 kPa),
   heating the mixture to a temperature above 150° C. under reflux until polyamide is dissolved, while the polyester remains unaffected, therewith forming a slurry;
   cooling the slurry;
   which cooling comprises diluting the slurry by addition of hot water with a temperature of at least 80° C., during which polyamide is precipitated to particles, the amount of water being effective to precipitate the polyamide;
   filtering the slurry over a first filter with a mesh larger than 0.2 μm therewith forming a filtrate and a residue, wherein the residue comprises the polyester and the filtrate comprises the polyamide particles,
   filtering the polyamide particles from the filtrate over a second filter to recover the polyamide, and
   recovering the polyester for further processing for depolymerization of the polyester.

2. Process according to claim 1, wherein recovering the polyamide comprises the step of adding water to the precipitated polyamide particles to remove the alcohol from the polyamide particles.

3. Process according to claim 1, wherein the hot water is boiling water.

4. Process according to claim 1, wherein the hot water is added in an amount of 10-200 wt. % relative to the alcohol, for instance 10-50% or 75-150 wt. %.

5. Process according to claim 1, wherein the branched or unbranched alcohol comprises 0.02-25 wt % water.

6. Process as claimed in claim 1, wherein the alcohol is a polyol, chosen from ethylene glycol, propylene glycol, and glycerol.

7. Process as claimed in claim 1, wherein the polyester is polyethyleneterephthalate.

8. Process according to claim 1, wherein the additive is a Ca-containing mineral, such as CaO, Ca(OH)$_2$, CaCO$_3$, a talc comprising mineral, mica, and combinations thereof.

9. Process according to claim 1, wherein the residue from the first filter is further processed by:
   closing an exit to the first filter;
   adding a carrier liquid to disperse the residue into a dispersion;
   adding a depolymerisation catalyst to the dispersion,
   depolymerising the polyester to obtain monomer and/or oligomer dissolved in the carrier liquid, and
   further separating the additive from the carrier liquid.

10. Process as claimed in claim 9, wherein the depolymerisation step occurs in a vessel comprising the first filter, and wherein the separation step is carried out by filtration through the first filter.

11. Process as claimed in claim 9, wherein prior to the depolymerisation step, the dispersion is transferred to a depolymerisation reactor.

12. Process according to claim 1, wherein use is made of equipment comprising at least two first filters in parallel, each with an entry and an exit, of which at least the entry can be opened or closed selectively for use of either one or the other or both filters for the filtration of the slurry.

13. Process according to claim 1, wherein the hot water is added as a mixture of the alcohol and water.

14. Process as claimed in claim 6, wherein the alcohol is ethylene glycol.

15. Process according to claim 14, wherein a PTFE filter is used for the first filter.

* * * * *